(12) United States Patent
Zeiske

(10) Patent No.: US 9,052,247 B2
(45) Date of Patent: Jun. 9, 2015

(54) DEVICE AND METHOD FOR EVALUATING SIGNALS OF LOAD CELLS WITH STRAIN GAUGES

(75) Inventor: Karsten Zeiske, Celle (DE)

(73) Assignee: Panasonic Industrial Devices Europe GmbH, Lueneburg (DE)

(*) Notice: Subject to any disclaimer, the term of this patent is extended or adjusted under 35 U.S.C. 154(b) by 0 days.

(21) Appl. No.: 13/984,325

(22) PCT Filed: Feb. 9, 2012

(86) PCT No.: PCT/DE2012/200006
§ 371 (c)(1),
(2), (4) Date: Aug. 8, 2013

(87) PCT Pub. No.: WO2012/107040
PCT Pub. Date: Aug. 16, 2012

(65) Prior Publication Data
US 2014/0182387 A1    Jul. 3, 2014

(30) Foreign Application Priority Data
Feb. 10, 2011 (DE) .................. 10 2011 010 945
Mar. 11, 2011 (DE) .................. 10 2011 013 658

(51) Int. Cl.
*G01L 1/00* (2006.01)
*G01L 1/22* (2006.01)
*G01G 3/142* (2006.01)

(52) U.S. Cl.
CPC ............... *G01L 1/225* (2013.01); *G01G 3/142* (2013.01)

(58) Field of Classification Search
CPC .................................... G01L 1/22; G01L 1/00
USPC ........................................................... 73/767
See application file for complete search history.

(56) References Cited

U.S. PATENT DOCUMENTS

| 3,960,010 A | 6/1976 | Gustafsson |
| 4,763,739 A | 8/1988 | Kasinoff |

(Continued)

FOREIGN PATENT DOCUMENTS

| DE | 2450111 A1 | 4/1975 |
| DE | 3538178 A1 | 4/1987 |

(Continued)

OTHER PUBLICATIONS

International Preliminary Report on Patentablity dated Aug. 13, 2013.
English language translation of German Office Action dated Dec. 1, 2011.

*Primary Examiner* — Lisa Caputo
*Assistant Examiner* — Octavia D. Hollington
(74) *Attorney, Agent, or Firm* — Patent Central LLC; Stephan A. Pendorf

(57) ABSTRACT

A device and a method for evaluating signals from load cells with strain gauges (SG), which require electronic signal evaluation with very low offset voltages due to the small output signal. In order to be able to use inexpensive components as well, two different operating points of the SG are set in two consecutive measurements, each being determined by a single voltage reference. The voltage in the zero branch of the bridge circuit of the SG is amplified in a differential amplifier and digitized with an ADC. In this context, the reference for the ADC is derived from the operating point of the SG that is determined by the respective voltage reference. The digitized offset and the initial value of the load cell are calculated from the two measurement values in an arithmetic logic unit.

9 Claims, 4 Drawing Sheets

(56) References Cited

U.S. PATENT DOCUMENTS

| | | |
|---|---|---|
| 4,765,422 A | 8/1988 | Hoffmann |
| 4,909,340 A * | 3/1990 | Kazais et al. ............... 177/211 |
| 7,361,867 B2 * | 4/2008 | Von Steuben et al. ....... 219/518 |
| 7,756,680 B2 * | 7/2010 | Hammerschmidt ........... 702/185 |
| 7,928,328 B2 * | 4/2011 | Suzuki et al. ..................... 177/1 |
| 2002/0104690 A1 | 8/2002 | Schurr |

FOREIGN PATENT DOCUMENTS

| | | |
|---|---|---|
| DE | 19838371 C2 | 3/2000 |
| DE | 10135238 A1 | 2/2003 |
| DE | 20023524 U1 | 9/2004 |
| DE | 102008014838 B3 | 9/2009 |
| GB | 1478156 A | 6/1977 |

\* cited by examiner

DEVICE AND METHOD FOR EVALUATING SIGNALS OF LOAD CELLS WITH STRAIN GAUGES

The invention relates to a device and a method for evaluating signals from load cells with strain gauges.

Most modern electromechanical scales work either according to the principle of electromagnetic force compensation or with load cells, which in turn work with strain gauges (SG). The electrical resistance in strain gauges changes even with very small displacements. They are stuck with special adhesive to components that undergo minimal deformation under load. Strain gauges can be used to manufacture scales of all sizes, from domestic scales to crane scales. For example, DE 3538178 A1 describes a bathroom scales for measuring bodyweight. DE 10135238 A1 describes scales for food, and DE 102008014838 B3 relates to a dispensing monitoring device for coffee machines. This device functions according to the same principle as the scales described in DE 19838371 C2 with one or more load cells. When multiple load cells are used, the signals therefrom are added together in a signal processing device. The load cells are constructed as leaf springs, to which the SG are glued.

DE 20023524 U1 describes a force measuring element for a scales that consists of a bar with two recesses. The reduced cross sections create two bending points, between which a parallel guide is formed when a load is applied to the ends of the bar. The measurement signal from the force measuring element is derived from an SG that is glued to the upper side of the bar. Four of these force measuring elements, which are connected to form a Wheatstone bridge, make up the load cells of the scales.

Under load, the SG are extended or compressed, causing a change in the electrical resistance thereof. This in turn alters the voltage state in the zero branch of the bridge circuit, which is amplified and displayed with a needle instrument, for example. Besides this purely analogue display, the amplified voltage state is also digitised in an analogue/digital converter (ADC), conditioned with a digital signal processor and displayed with a signal output, as described in DE 102008014838 B3, for example.

A disadvantage of the scales described is that, since the output signal of the load cells is so small, typically in the order of 2 mV per Volt input terminal voltage, high-performance and thus also expensive amplifier circuits must be used. Alternatively, ADCs with very high resolution may also be used when the signal is digitised. But these are also not available at the low end of the market.

The object underlying the invention is therefore to enable high-resolution load cell evaluation with inexpensive components.

This object is solved with a device having the features of claim 1 and a method having the features of claim 9, wherein two different operating points of the SG are set for two consecutive measurements. The voltage in the zero branch of the bridge circuit of the SG is amplified in a differential amplifier and digitised using an ADC. In this context, the same voltage references are used for the ADC and to set the operating point of the SG. The digitised offset and the initial value of the load cell are calculated from the two measurement values in an arithmetic logic unit.

The advantages gained with the invention consist particularly in that the temperature-dependent offset voltages are compensated by simple operation amplifiers. One or more load cells may be used in order to increase flexibility.

Further details regarding the invention will be described with reference to the figures.

Figure 1:
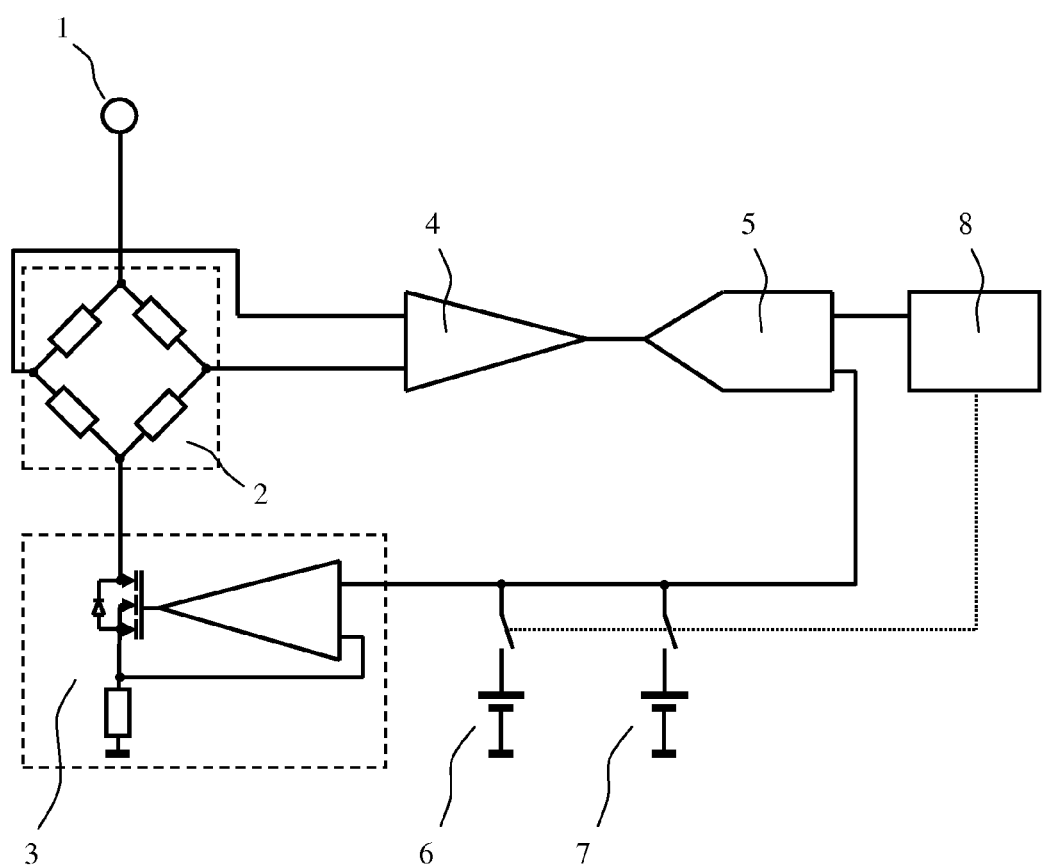
FIG. 1 is a diagrammatic illustration of the evaluation circuit layout including load cell.

FIG. 1 is a diagrammatic illustration of the layout of the evaluation circuit including the load cell. The operating voltage is drawn from a DC bus 1, to which a load cell with a strain gauge (SG) 2 is connected. SG 2 is connected in the manner of a Wheatstone bridge. Current I through SG 2 is controlled by a power source 3. The resistance change $\Delta R$ in SG 2 due to expansion is proportional to elongation E with constant of proportionality k and the combined resistance R of the bridge:

$$\frac{\Delta R}{R} = \frac{\Delta U}{I \cdot R} \qquad (1)$$
$$= k \cdot \varepsilon$$

Voltage $\Delta U$ in the zero branch of the bridge circuit is amplified by a factor A in differential amplifier 4 and digitised by means of an analogue/digital converter (ADC) 5. The same voltage reference 6 and 7 is used for ADC 5 and power source 3. Consequently, current I is determined by reference resistance $R_I$ and voltage reference $U_{ref}$.

$$I = \frac{U_{ref}}{R_I} \qquad (2)$$

Besides signal $\Delta U$, which is modified by expansion, however, offset voltages $U_{offset}$ are also amplified in differential amplifier 4 due to imbalances in differential amplifier 4 or for example caused by thermoelectric voltages at joints. Consequently, the input voltage at ADC 5 is given by the following:

$$U_{ADC} = A \cdot (\Delta U + U_{offset}) \qquad (3)$$

In turn, digitised value N at the output from ADC 5 thus results from:

$$N = N_{max} \cdot \frac{A \cdot (\Delta U + U_{offset})}{U_{ref}} \qquad (4)$$

In this context, $N_{max}$ is the maximum output value from ADC 5 and $U_{ref}$ is the reference voltage. Equations (1) and (2) yield:

$$N = N_{max} \cdot \frac{A \cdot \left(\frac{U_{ref}}{R_I} R \cdot k\varepsilon + U_{offset}\right)}{U_{ref}} \qquad (5)$$

First voltage reference 6 may be substituted with a second voltage reference 7 by the use of switches. Thus, power source 3 may be operated according to equation (2) at two different operating points $I_1$ and $I_2$. The offset voltage can be calculated from two measurements $N_1$ and $N_2$, each with the first and second voltage references, by applying:

$$U_{offset} = \frac{N_1 - N_2}{A \cdot N_{max}} \cdot \frac{U_{ref,1} \cdot U_{ref,2}}{U_{ref,2} - U_{ref,1}} \qquad (6)$$

This returns elongation $\epsilon$ from these two measurements with:

$$\varepsilon = \frac{R_l}{2 \cdot A \cdot N_{max} \cdot R \cdot k}\left(N_1 + N_2 - [N_1 - N_2] \cdot \frac{U_{ref,1} + U_{ref,2}}{U_{ref,2} - U_{ref,1}}\right) \qquad (7)$$

The values of the reference voltages may be correlated via a factor B as follows:

$$U_{ref,2} = B \cdot U_{ref,1} \qquad (8)$$

In this way, equation (7) is simplified to:

$$\varepsilon = \frac{R_l}{2 \cdot A \cdot N_{max} \cdot R \cdot k}\left(N_1 + N_2 + [N_1 - N_2] \cdot \frac{1+B}{1-B}\right) \qquad (9)$$

By suitable selection of B, for example B=¾, the expression may be further simplified to:

$$\varepsilon = \frac{R_l}{2 \cdot A \cdot N_{max} \cdot R \cdot k}(8 \cdot N_1 - 6 \cdot N_2) \qquad (10)$$

The measured weight is obtained from the elongation via a calibration, so that the quotient in equation (10) may be replaced with a calibration factor. Accordingly, the operation and switch setting at voltage references 6, 7 may be carried out with a simple arithmetic logic unit 8 and displayed as required.

Figure 2:
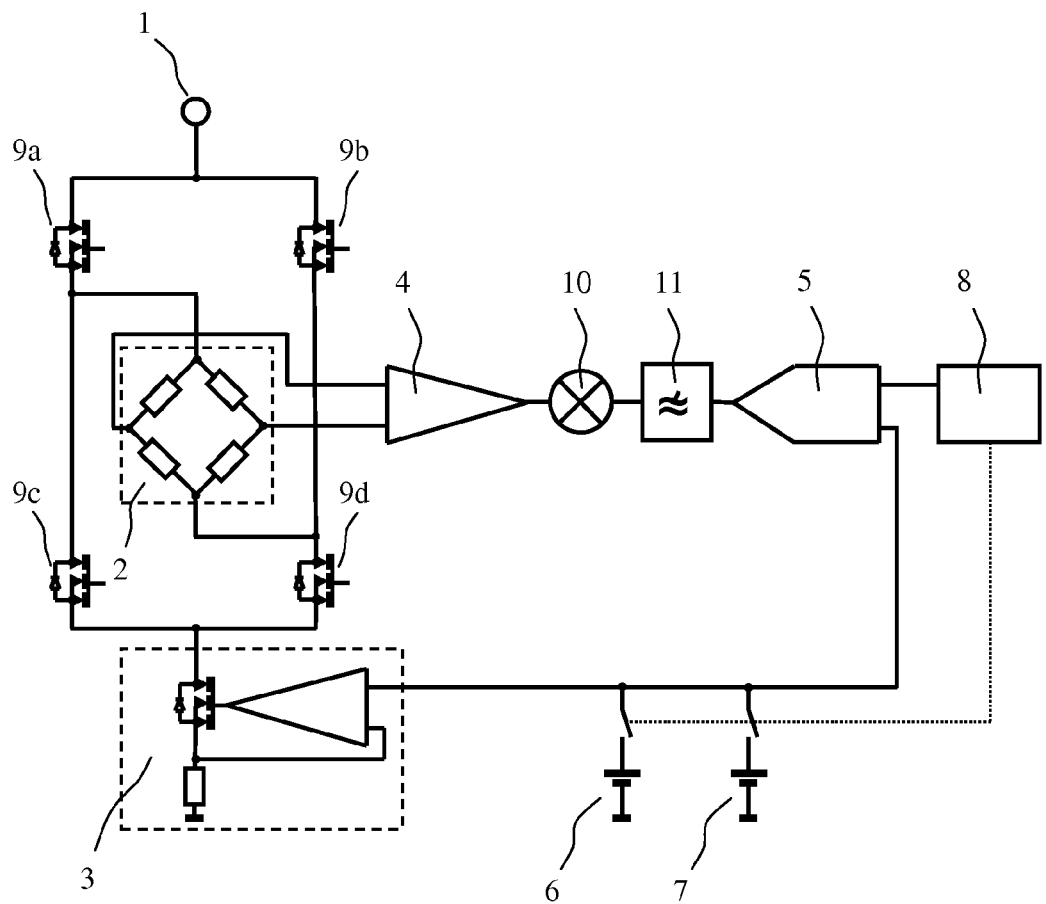
FIG. 2 is a diagrammatic illustration of an advantageous refinement of the invention.

If non-precision differential amplifiers are used, the offset voltage may be significantly greater than the voltage in the zero branch of the bridge circuit. Accordingly, it may be necessary to select a substantially higher resolution for ADC 5 than the desired resolution of the scales would require. In an advantageous refinement of the invention, shown diagrammatically in FIG. 2, the offset voltage of differential amplifier 4 is also reduced with a carrier frequency process.

For this, the current is modulated in the direction of flow thereof through SG 2 with an H bridge consisting of electronic switches 9a to 9d. The AC voltage differential signal, of which the amplitude is modulated by the SG bridge deflection, is amplified in differential amplifier 4 and demodulated in a demodulator 10. Demodulation functions like a narrow band pass filter that only allows the excitation frequency to pass. This is then filtered out by a low pass filter 11, so that a DC voltage proportional to the SG deflection is present at the output. However, offset voltages in demodulator 10, ADC 5 or within power source 3 cannot be reduced in this way. These are reduced by varying the operating point of power source 3 and subsequent evaluation in arithmetic logic unit 8.

A simple microcontroller is well suited to creating the arithmetic logic unit 8. Even simple microcontrollers often include an ADC 5. However, such integrated analogue-to-digital converters usually do not have the resolution necessary for the application. It is usually possible to increase the resolution sufficiently at the expense of the measurement frequency with oversampling techniques. In most scales applications, the reduced measurement frequency is not an insurmountable problem.

Figure 3:
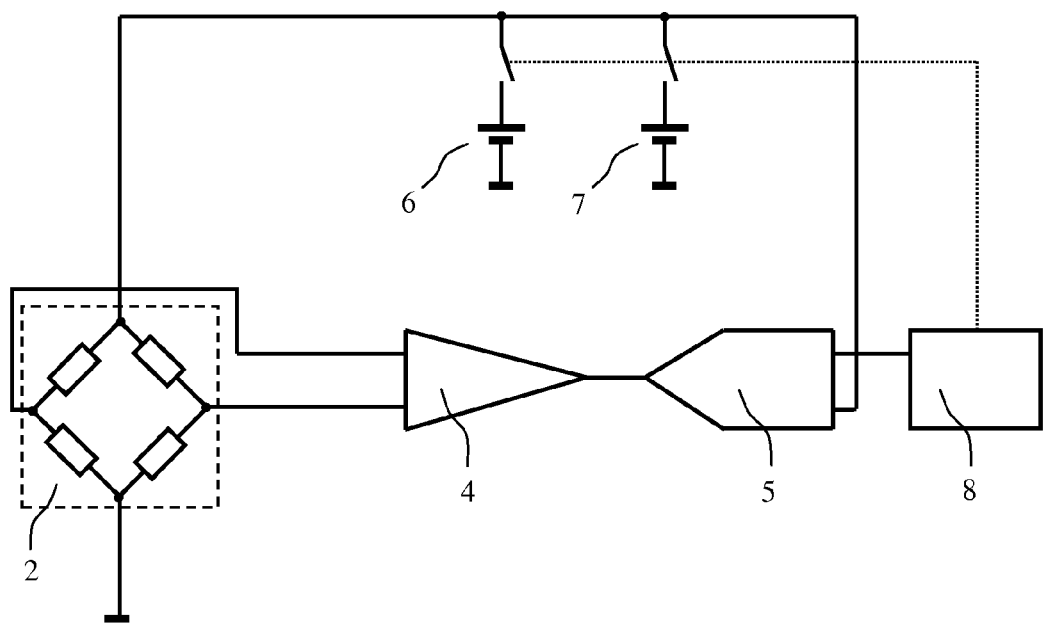
FIG. 3 shows a variation of the invention.

In a modification of the invention, reference voltages 6 and 7 may also be applied directly to SG 2, as shown in FIG. 3. If multiple load cells are used, however, the respective SG 2 is connected in parallel. Here too, the offset voltage of differential amplifier 4 may also be reduced with a carrier frequency process, as described in the preceding. However, when the H bridge is activated (see FIG. 2) a dead time must be observed between the two states with different current directions through the SG 2 to ensure that, for example, switches 9a and 9c are not switched at the same time, which would result in an excessively high current flow in the bridge. Said excessively high current flow is prevented by power source 3 in the configuration according to FIG. 2. Said dead time between the two states causes asymmetries in demodulator 10.

Figure 4:
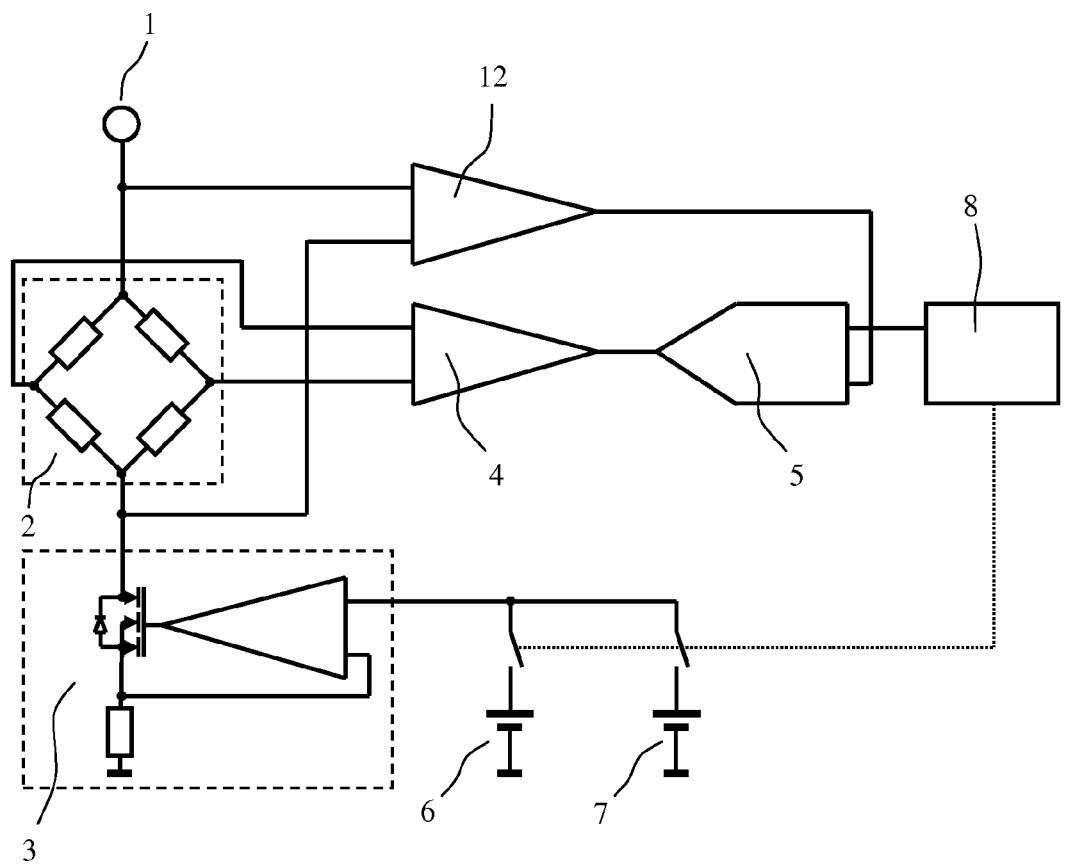
FIG. 4 is a diagrammatic illustration of another advantageous refinement of the invention.

The embodiments of the invention described in the preceding do not make direct used of the correlation between elongation 8 and the relative change in resistance $\Delta R/R$ described in equation (1). Instead, they require an ohmic behaviour of SG 2 and make use of the form $\Delta U/U$ derived via Ohm's law. For SG 2 with resistance wire, this hypothesis is certainly correct in the linear region of SG 2. Most SG 2 do not exhibit ohmic behaviour in thick film technology. The refinement of the invention refinement shown diagrammatically in FIG. 4 is based on the direct use of equation (1), in which the current through SG 2 is controlled by a power source 3, corresponding the respectively switched voltage reference 6 or 7, and the reference voltage for SG 5 is derived from the voltage drop over SG 2 by differential amplifier 12. In this way, the reference voltage from SG 5 is derived directly from the two operating points of SG 2 that are determined via the respective voltage reference.

The invention claimed is:

1. A device in which signals of load cells with strain gauges are evaluated, comprising:
    a load cell with one or more strain gauges (2) connected in a bridge circuit for indicating, in the form of a voltage signal, a change in load on the load cell,
    at least one differential amplifier for amplifying the voltage ($\Delta U$) applied across the null branch of the bridge circuit,
    an analogue/digital converter for generating a digitized value (N) of the amplified voltage ($\Delta U$), and
    a first and a second reference voltage source (6, 7) for generating a first or a second reference voltage ($U_{ref1}$, $U_{ref2}$) respectively for operating the one or more strain gauges (2) at two different operating points, and also for deriving a reference for the analogue/digital converter (5) from the respective constant reference voltage ($U_{ref1}$, $U_{ref2}$), and
    an arithmetic logic unit (8) to which the values (N1, N2) are fed, having been determined with the two reference voltages ($U_{ref1}$, $U_{ref2}$) and digitized, wherein a load to be measured is given by calculating the elongation (e) according to the following formula:

$$\varepsilon = \frac{R_l}{2 \cdot A \cdot N_{max} \cdot R \cdot k}\left(N_1 + N_2 - [N_1 - N_2] \cdot \frac{U_{ref,1} + U_{ref,2}}{U_{ref,2} - U_{ref,1}}\right)$$

and determining the quotient $$\frac{R_l}{2 \cdot A \cdot N_{max} \cdot R \cdot k}$$

by calibration.

2. The device according to claim 1, wherein an amplifier derives an operating voltage of the one or more strain gauges (2) linearly from the respective first or second reference voltage ($U_{re1}$, $U_{ref2}$) at both of the operating points.

3. The device according to claim 1, wherein a current source (3) derives a current (1) through the one or more strain gauges (2) linearly from the respective first or second reference voltage ($U_{ref1}$, $U_{ref2}$).

4. The device according to claim 3, wherein the current (I) through the one or more strain gauges (2) is modulated in its direction of flow with an H bridge consisting of four electronic switches (9a, 9b, 9c, 9d), and the AC voltage differential signal of the one or more strain gauges (2), which is amplitude modulated by the deflection, is amplified in the differential amplifier (4), demodulated in a demodulator (10), and filtered with a low-pass (11), before being fed to the analogue/digital converter (5) to generate the digitized value (N1, N2).

5. The device according to claim 3, wherein the reference for the analogue/digital converter (5) is derived from the voltage drop ($\Delta U$) across the one or more strain gauges (2) by means of at least one differential amplifier (4).

6. The device according to claim 3, wherein the amplified signals from multiple strain gauges (2) connected in series in the current path of the current source (3) are added with a summing amplifier, so that the summed signal is digitised in the analogue/digital converter (5).

7. The device according to claim 1, wherein the arithmetic logic unit (8) is realized with a microcontroller.

8. The device according to claim 7, wherein the analogue/digital converter (5) is integrated in the microcontroller.

9. A method for evaluating signals of load cells with one or more strain gauges connected in a bridge circuit, comprising at least one differential amplifier for amplifying a voltage ($\Delta U$) applied across the null branch of the bridge circuit, and an analogue/digital converter for generating a digitalised value (N) of the amplified voltage ($\Delta U$), the method comprising determining a load with two successive measurements, wherein the one or more strain gauges are operated at two different operating points, defined in each case by a first or a second reference voltage ($U_{ref1}$, $U_{re2}$), wherein the reference for the analogue/digital converter is derived from the respective constant reference voltage ($U_{ref1}$, $U_{ref2}$), which also defines the respective operating point of the one or more strain gauges (2), and from the two digitalised values (N1, N2), in an arithmetic unit, the load is determined by calculating the elongation ($\epsilon$) according to the following formula:

$$\varepsilon = \frac{R_I}{2 \cdot A \cdot N_{max} \cdot R \cdot k}\left(N_1 + N_2 - [N_1 - N_2] \cdot \frac{U_{ref,1} + U_{ref,2}}{U_{ref,2} - U_{ref,1}}\right)$$

and the quotient $$\frac{R_I}{2 \cdot A \cdot N_{max} \cdot R \cdot k}$$

is determined by calibration.

* * * * *